Patented Sept. 3, 1946

2,406,910

UNITED STATES PATENT OFFICE 2,406,910

TREATMENT OF REFRACTORY MATERIALS

Robert A. Schoenlaub, Tiffin, Ohio, assignor to Basic Refractories, Inc., Cleveland, Ohio, a corporation of Ohio No Drawing. Application January 6, 1943, Serial No. 471,455

6 Claims. (Cl. 117—123)

Refractories such as chrome ore, and periclase, while desirable in many respects, have certain proclivities toward deterioration under furnace condition. In exposure to high temperature slags and oxide-bearing vapors, chrome ore for instance tends to absorb ferrous or ferric oxide, as well as some other oxides, by solid solution, the absorbed substances diffusing into the chrome-spinel grains and becoming an integral part thereof. This changes their physical properties, and particularly important and destructive is the increase in volume, and this results in what is variously termed "bloating," "cauliflowering," "swelling," or "peeling," all of which considerably reduce the ultimate service life of refractories made from chrome ore. Periclase refractories are similarly affected, but to a lesser extent. These refractories also have another disadvantage in that chromite and periclase crystallize in the isometric system, usually in small equi-dimensional crystals. They therefore do not intrinsically possess the keying action which is imparted in some refractory substances by prismatic crystals, such as mullite, or by tabular crystals such as corundum. As a consequence they are more sensitive to spalling and structural failure than some of the more acid types of refractories. Commonly, in an effort to mitigate the destructive effects of absorption and the structural deficiencies of basic refractories, it has been customary for refractory manufacturers to use as coarse a sizing as possible. Brick made from coarsely sized material are usually more resistant to spalling than brick made from similar material finely sized. Also, by the use of coarse sizing, the volume-surface relationship is favorably affected, so that a smaller amount of surface is exposed to destructive absorption. However, as the sizing increases, the workability of a refractory mixture and its permeability are adversely affected. These factors constitute practical limits to advantages which may be gained by sizing. A common expedient is to use coarse chrome ore and to use finer periclase clinker, which is less sensitive to absorption.

Efforts have been made to improve chrome ore or periclase refractories by providing the grains with encasements of refractory silicates by means of calcium and magnesium silicates fused on the clinker grains by high temperature firing in a rotary kiln. The cost of this is prohibitive for what advantages result. In accordance with the present invention however, basic refractory materials, chrome ore, magnesia refractories, etc., may be coated with a beneficial silicate encasement without prior burning of the grains, and such as to allow full latitude in application of the refractory material in desired kinds of usages, and the procedure is relatively simple and of low cost.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The refractory material to be treated, as for instance chrome ore, magnesian refractory material, etc., and designated for convenience "basic refractory material," is crushed and sized to desired mesh, and the grains are subjected to coating by a silicate material which permits ultimate moistening and molding or bringing into desired shape or placement for use. Such silicate is in contrast to clays, bentonites, etc., as it is of a chemical character not introducing deleterious alumina. Plastic hydrous magnesium silicates which with water swell to a voluminous gel, and are thereby distinguished from such silicates as serpentine are excellent materials for this purpose, and although they may be provided synthetically, they may be had from natural deposits to advantage. For instance, one such deposit occurs near Hector in San Bernardino County, California. It is characterized by a ratio of silica to magnesia usually slightly greater than 2:1 by weight, and it usually contains alkalies, of which lithia is notable. It differs from the aluminous bentonite in its X-ray diffraction pattern and indices of refraction. Analysis, as freed from associated fine calcite, shows ignition loss 5.7, MgO 25.1, $SiO_2$ 57.8, $Na_2O$ 2.9 per cent, and traces of $R_2O_3$. Analysis including initially associated calcite, and in the form in which it may also be used shows ignition loss 25.55, MgO 11.09, $SiO_2$ 26.14, $Na_2O$ 1.30, CaO 29.28 per cent, and traces of $R_2O_3$. Physically, the material is unctuous and swells copiously to a voluminous, stable gel when immersed in water. These gels are variously tacky and plastic, depending upon the amount of water used and other factors. Such physical characteristics of plastic hydrous magnesium silicate materials allow emplacement of a thin, persistent layer on the refractory grains treated. This may be applied alone as the coating material, or it may carry other material, as a thick gelatinous suspension. The refractory grains in such addition or additions may be mixed in suitable mixing apparatus, as for instance a pan mixer, the suspension being added to the refractory grains, allowing sufficient time for good distribution of the water and silicate material. The coated grains may then be pressed into brick or shapes which can be fired, or alternatively, with suitable bonding materials well known in the art, may as chemically bonded brick be sold and applied as un-fired brick. Alternatively also, the coating material can be incorporated dry with the refractory grains, and may finally be tempered with water in amount for desired molding condition.

As indicated, the plastic hydrous magnesium silicate may be applied alone to the refractory grains, or it may be used with other materials. For the latter, there may be employed for instance magnesium hydrate. The plastic hydrous magnesium silicate or hectorite, and the magnesia can conveniently for instance be added dry to the refractory grains. On mixing, and tempering with water, the coating substance will be distributed over the particles. With small amounts, the material may be applied as a thick slurry in water. By coating refractory grains thus with plastic hydrous magnesium silicate and magnesium hydrate, and exposing to a high temperature, as in the furnace heat if the material is applied un-burned, or in the firing process if molded bricks or shapes are burned before being used, there is a reaction, hectorite (free from lime) and the magnesium hydrate forming $2MgO.SiO_2$. Amounts of for instance 2 to 10 per cent of the magnesium silicate and particularly a range around 5 per cent give very desirable results, and for example for one part of hectorite ½ part or more of magnesium oxide or its equivalent in magnesium hydrate may make up the reaction materials.

If desired, instead of allowing reaction with plastic hydrous magnesium silicate to the formation of $2MgO.SiO_2$ as ultimately fired, the coating material may be chosen to eventuate in $2CaO.SiO_2$. For this, lime-bearing hectorite may be used, and correcting lime, such as finely ground, chemical grade hydrate may be added to bring up the molecular ratio of lime to silica as 2:1. Borax to give for instance 0.05 per cent of $B_2O_3$ or slightly more in the finished refractory may be added, as with the tempering water. Silicate for coating purposes should not be added in amount larger than required for effective coating. It is generally more susceptible than other constituents to fluxing. Consequently, a desirable balance may be made between the absorption mitiation and fluxing tendency. Usually, 3 to 15 per cent of coating silicate material is satisfactory. Other silicates, present as impurities or otherwise, are omitted from present consideration.

Refractory particles so coated with plastic hydrous magnesium silicate, with optional inclusion of a reactive alkaline earth compound, such as hydrate or oxide or carbonate, with a suitable amount of moistening and tempering water, may be compacted to form furnace linings, or molded shapes, etc. And, it is a particular convenience that such refractory materials, involving particles of chromite or of magnesia character, may thus be employed in either un-fired or in fired condition, the final reaction of the plastic hydrous magnesian silicate to a refractory silicate occurring when the material is subjected to elevated temperature, in burning or in furnace use.

As an example: A massive chrome ore analyzing $Cr_2O_3$ 34.5 per cent, CaO 1.0, MgO 16.1, $SiO_2$ 4.0, $Fe_2O_3$ 15.4, and $Al_2O_3$ 29.7 is crushed and sized, and with 45 parts of −8 +20 mesh particles and 20 parts of −20 +50 mesh particles and 22 parts of −150 mesh chrome ore there are incorporated 8 parts of −150 mesh hydration-resistant high magnesia clinker, and 3.8 parts of −200 mesh hectorite (MgO 25 per cent, $SiO_2$ 57 per cent), and 2.8 parts of extremely finely divided magnesium hydrate, and 2 parts of "goulac" or waste sulphite liquor bond. After mixing in a pan mixer and tempering to desired pressing consistency the material is formed into shapes under high pressure, dried and fired. Alternatively, the dried bricks may be set in a furnace in un-fired condition. In the latter case, it may be desired to also incorporate in the material a chemical bond.

Other modes of applying the principle of the invention may be employed, change being made as regards the details described, provided the features stated in any of the following claims, or the equivalent of such, be employed.

I therefore particularly point out and distinctly claim as my invention:

1. A process of treating refractory material, which comprises coating the surface of basic refractory material particles with an alkaline earth compound of the group consisting of magnesium and calcium hydroxides and oxides, and to react therewith a substantially non-aluminous gel-forming hydrous magnesium silicate of the composition of hectorite from San Bernardino County, California, and contacting the reaction mixture with water for swelling the gel-forming material, and compacting the coated particles together.

2. A process of treating refractory material, which comprises applying to the surface of basic refractory material particles a coating of magnesium hydroxide, and to react therewith a substantially non-aluminous gel-forming hydrous magnesium silicate of the composition of hectorite from San Bernardino County, California, and contacting the reaction mixture with water for swelling the gel-forming material, and compacting the coated particles together.

3. A process of treating refractory material, which comprises applying to the surface of basic refractory material particles a coating of lime, and to react therewith a substantially non-aluminous gel-forming hydrous magnesium silicate of the composition of hectorite from San Bernardino County, California, and contacting the reaction mixture with water for swelling the gel-forming material, and compacting the coated particles together.

4. A process of treating refractory material, which comprises applying to the surface of un-fired basic refractory material particles a coating of an alkaline earth compound of the group consisting of magnesium and calcium hydroxides and oxides, and to react therewith a substantially non-aluminous gel-forming hydrous magnesium silicate of the composition of hectorite from San Bernardino County, California, and contacting the reaction mixture with water for swelling the gel-forming material, compacting the coated particles together, and finally heating to react the coating.

5. A process of treating refractory material, which comprises applying to the surface of basic refractory material particles a coating of magnesium hydroxide, and to react therewith a substantially non-aluminous gel-forming hydrous magnesium silicate of the composition of hectorite from San Bernardino County, California, and contacting the reaction mixture with water for swelling the gel-forming material, compacting the coated particles together, and finally heating to react the coating.

6. A process of treating refractory material, which comprises applying to the surface of basic refractory material particles a coating of lime, and to react therewith a substantially non-aluminous gel-forming hydrous magnesium silicate of the composition of hectorite from San Bernardino County, California, and contacting the reaction mixture with water for swelling the gel-forming material, compacting the coated particles together, and finally heating to react the coating.

ROBERT A. SCHOENLAUB.